(12) United States Patent
Takahashi et al.

(10) Patent No.: US 11,159,092 B2
(45) Date of Patent: Oct. 26, 2021

(54) POWER CONVERSION DEVICE

(71) Applicant: Mitsubishi Electric Corporation, Tokyo (JP)

(72) Inventors: Tatsuya Takahashi, Tokyo (JP); Shigeo Hayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/619,168

(22) PCT Filed: Aug. 9, 2017

(86) PCT No.: PCT/JP2017/028941
§ 371 (c)(1),
(2) Date: Dec. 4, 2019

(87) PCT Pub. No.: WO2019/030859
PCT Pub. Date: Feb. 14, 2019

(65) Prior Publication Data
US 2020/0177097 A1 Jun. 4, 2020

(51) Int. Cl.
*H02M 7/483* (2007.01)
*H02M 7/00* (2006.01)
*H02M 7/5387* (2007.01)

(52) U.S. Cl.
CPC ........... *H02M 7/483* (2013.01); *H02M 7/003* (2013.01); *H02M 7/5387* (2013.01)

(58) Field of Classification Search
CPC .. H02M 7/483; H02M 7/5387; H02M 7/7575; H02M 7/003
See application file for complete search history.

(56) References Cited

U.S. PATENT DOCUMENTS

2011/0019442 A1  1/2011 Yamada et al.
2013/0148392 A1  6/2013 Inoue et al.
(Continued)

FOREIGN PATENT DOCUMENTS

EP   3 282 573 A1   2/2018
JP   2011024390 A   2/2011
(Continued)

OTHER PUBLICATIONS

International Search Report (PCT/ISA/210), with translation, and Written Opinion (PCT/ISA/237) dated Sep. 26, 2017, by the Japan Patent Office as the International Searching Authority for International Application No. PCT/JP2017/028941.
(Continued)

*Primary Examiner* — Peter M Novak
(74) *Attorney, Agent, or Firm* — Buchanan Ingersoll & Rooney PC (57) ABSTRACT

A power conversion device according to one embodiment includes a plurality of submodules connected in series to each other. In each submodule, a first terminal, a second terminal and a third terminal are provided on or provided to protrude from a surface of a package. A first semiconductor switching element is built into the package and connected between the first terminal and the second terminal. A second semiconductor switching element is built into the package and connected between the second terminal and the third terminal. A DC capacitor is built into the package and connected between the first terminal and the third terminal.

6 Claims, 11 Drawing Sheets

(56) References Cited

U.S. PATENT DOCUMENTS

| | | | |
|---|---|---|---|
| 2016/0261178 A1* | 9/2016 | Sato | H02M 1/08 |
| 2017/0163171 A1* | 6/2017 | Park | H02M 7/483 |
| 2018/0041135 A1 | 2/2018 | Onishi et al. | |
| 2018/0262120 A1* | 9/2018 | Zhang | H01L 25/072 |

FOREIGN PATENT DOCUMENTS

| | | | | |
|---|---|---|---|---|
| JP | 5868561 B1 * | 2/2016 | | H02M 7/25 |
| WO | 2015037537 A1 | 3/2015 | | |
| WO | 2015/131931 A1 | 9/2015 | | |
| WO | WO-2015131931 A1 * | 9/2015 | | H02M 7/003 |
| WO | 2016162915 A1 | 10/2016 | | |
| WO | 2017002390 A1 | 1/2017 | | |

OTHER PUBLICATIONS

Extended European Search Report dated Jul. 8, 2020, issued by the European Patent Office in corresponding European Application No. 17920796.4. (8 pages).

\* cited by examiner

POWER CONVERSION DEVICE

TECHNICAL FIELD

The present disclosure relates to a self-exciting power conversion device formed by cascade-connecting a plurality of converter cells and suitably used in, for example, high-voltage direct-current power transmission, a frequency converter and the like.

BACKGROUND ART

A modular multilevel converter (MMC) is known as a large-capacity power conversion device connected to a power system. The modular multilevel converter has, for each phase of an alternating current, an upper arm circuit connected to a high potential-side DC node and a lower arm circuit connected to a low potential-side DC node. Each arm circuit is formed by cascade-connecting multiple converter cells.

Each converter cell includes a capacitor serving as an energy accumulator, first and second input/output nodes, and a bridge circuit configured to perform switching between connection and non-connection of a portion between these input/output nodes and the capacitor. A half bridge-type circuit, a full bridge-type circuit or the like is used as the bridge circuit.

A method commonly used in an actual high-voltage converter is a method for forming a block from a plurality of converter cells, and vertically stacking the blocks to form a tower (see, for example, FIG. 5 in PTL 1 (International Publication No. 2016/162915)). In the case of this literature, each block is arranged in a tray of an insulator.

CITATION LIST

Patent Literature

PTL 1: International Publication No. 2016/162915

SUMMARY OF INVENTION

Technical Problem

Half bridge-type converter cells and full bridge-type converter cells may be arranged in a mixed manner to form each arm circuit in some cases. As one example, it is conceivable that a half of a plurality of converter cells forming each arm circuit are full bridge-type converter cells and the other half are half bridge-type converter cells. In this case, a tower formed only of the full bridge-type converter cells and a tower formed only of the half bridge-type converter cells can be provided.

However, as another example, when each arm circuit includes only a few (e.g., two to three) full bridge-type converter cells, half bridge-type converter cells and the full bridge-type converter cells must be arranged in a mixed manner in one tower. This causes a problem in terms of space efficiency because the half bridge-type converter cells and the full bridge-type converter cells differ in size.

The present disclosure has been made in view of the above-described problem and an object of the present disclosure is to provide an MMC-type power conversion device in which half bridge-type converter cells and full bridge-type converter cells can be arranged with high space efficiency.

Although the extreme example has been described above, the power conversion device according to the present disclosure is widely applicable to the case in which half bridge-type converter cells and full bridge-type converter cells are arranged in a mixed manner, regardless of the number of the converter cells.

Solution to Problem

A power conversion device according to one embodiment includes a plurality of submodules connected in series to each other. Each of the plurality of submodules includes: a first terminal, a second terminal and a third terminal; a first semiconductor switching element; a second semiconductor switching element; and a DC capacitor. The first terminal, the second terminal and the third terminal are provided on or provided to protrude from a surface of a package. The first semiconductor switching element is built into the package and connected between the first terminal and the second terminal. The second semiconductor switching element is built into the package and connected between the second terminal and the third terminal. The DC capacitor is built into the package and connected between the first terminal and the third terminal. The plurality of submodules include a first submodule and a second submodule that are adjacent to each other. The first terminal of the first submodule and the first terminal of the second submodule are connected to each other through a wiring. The third terminal of the first submodule and the third terminal of the second submodule are connected to each other through a wiring.

Advantageous Effects of Invention

According to the above-described embodiment, a single submodule can be used as a half bridge-type converter cell, and two adjacent submodules can be used as a full bridge-type converter cell by connecting terminals thereof to each other. Therefore, half bridge-type converter cells and full bridge-type converter cells can be arranged with high space efficiency.

DESCRIPTION OF EMBODIMENTS

Each embodiment will be described in detail hereinafter with reference to the drawings. The same or corresponding portions are denoted by the same reference characters and description thereof will not be repeated.

First Embodiment

[Schematic Configuration of Power Conversion Device]

Figure 1:
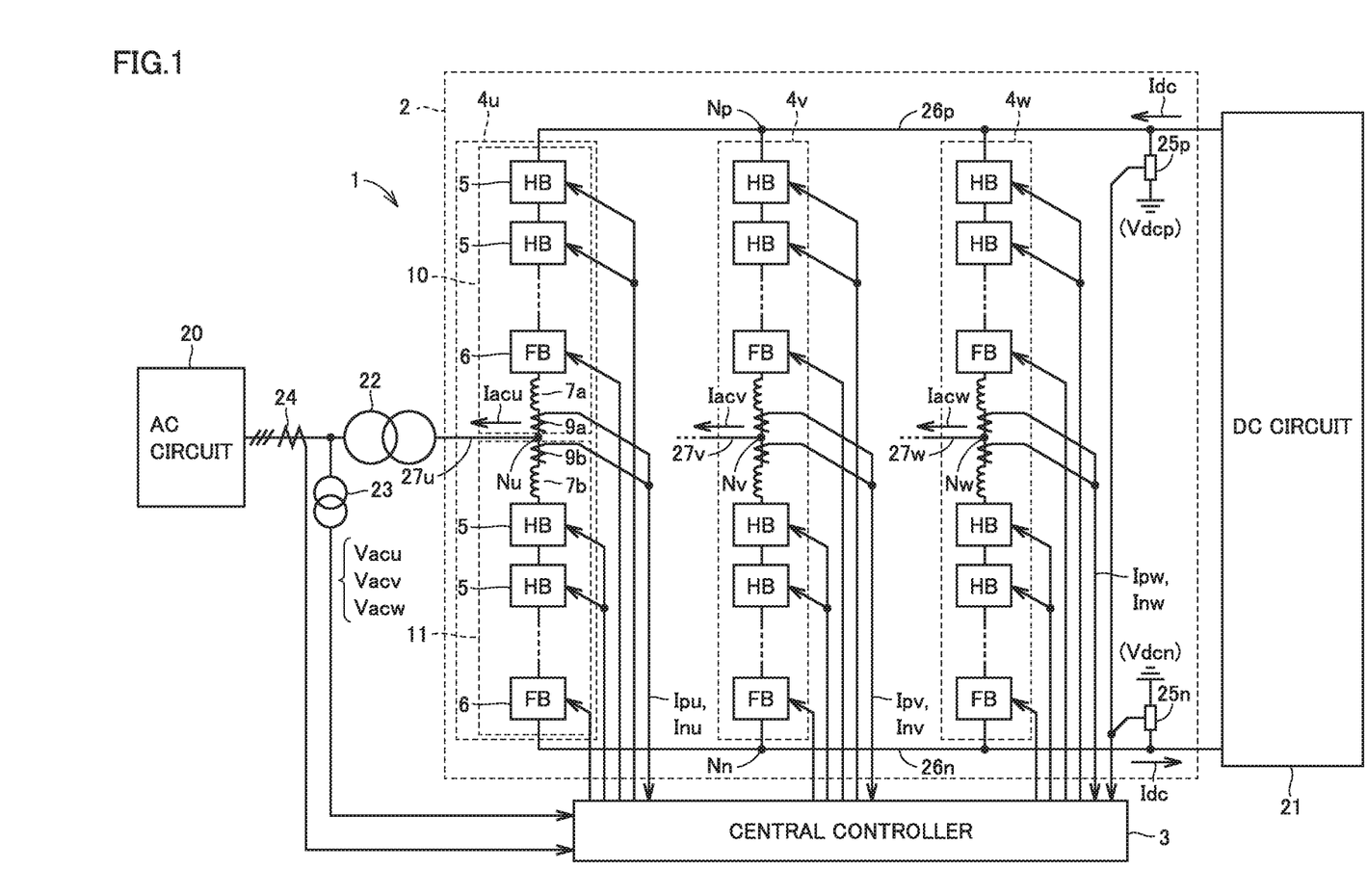
FIG. 1 is a schematic configuration diagram showing an example power conversion device.

FIG. 1 is a schematic configuration diagram showing an example power conversion device. Referring to FIG. 1, the power conversion device includes leg circuits 4u, 4v and 4w (which are denoted as a leg circuit 4 when they are collectively referred to or an unspecified one is referred to) serving as main circuits, and a central controller 3 configured to control leg circuit 4.

Leg circuit 4 is provided for each of a plurality of phases for an alternating current. Leg circuit 4 is connected between an AC circuit 20 and a DC circuit 21, and performs power conversion between these circuits. FIG. 1 shows the case in which AC circuit 20 is a three-phase AC circuit, and three leg circuits 4u, 4v and 4w are provided to correspond to a U phase, a V phase and a W phase, respectively.

AC nodes Nu, Nv and Nw provided in leg circuits 4u, 4v and 4w, respectively, are connected to AC circuit 20 with an interconnection transformer 22 being interposed. AC circuit 20 is, for example, an AC power system including an AC power supply and the like. For ease of illustration, FIG. 1 does not show connection of AC nodes Nv and Nw to interconnection transformer 22.

DC nodes Np and Nn (i.e., high potential-side DC node Np and low potential-side DC node Nn) provided in common for each leg circuit 4 are connected to DC circuit 21. DC circuit 21 corresponds to a connection wiring to a DC power system in a high-voltage direct-current (HVDC) system or another power conversion device in a BTB (Back To Back) system.

The HVDC system is configured to convert high-voltage AC power to DC power and perform DC long-distance power transmission. Power conversion device 1 in FIG. 1 is used for this AC/DC conversion. The BTB system is configured to perform forward conversion for converting AC to DC and reverse conversion for converting DC to AC, thereby implementing power interchange between two AC circuits. Power conversion device 1 in FIG. 1 is used for the forward conversion and the reverse conversion.

Figure 2:
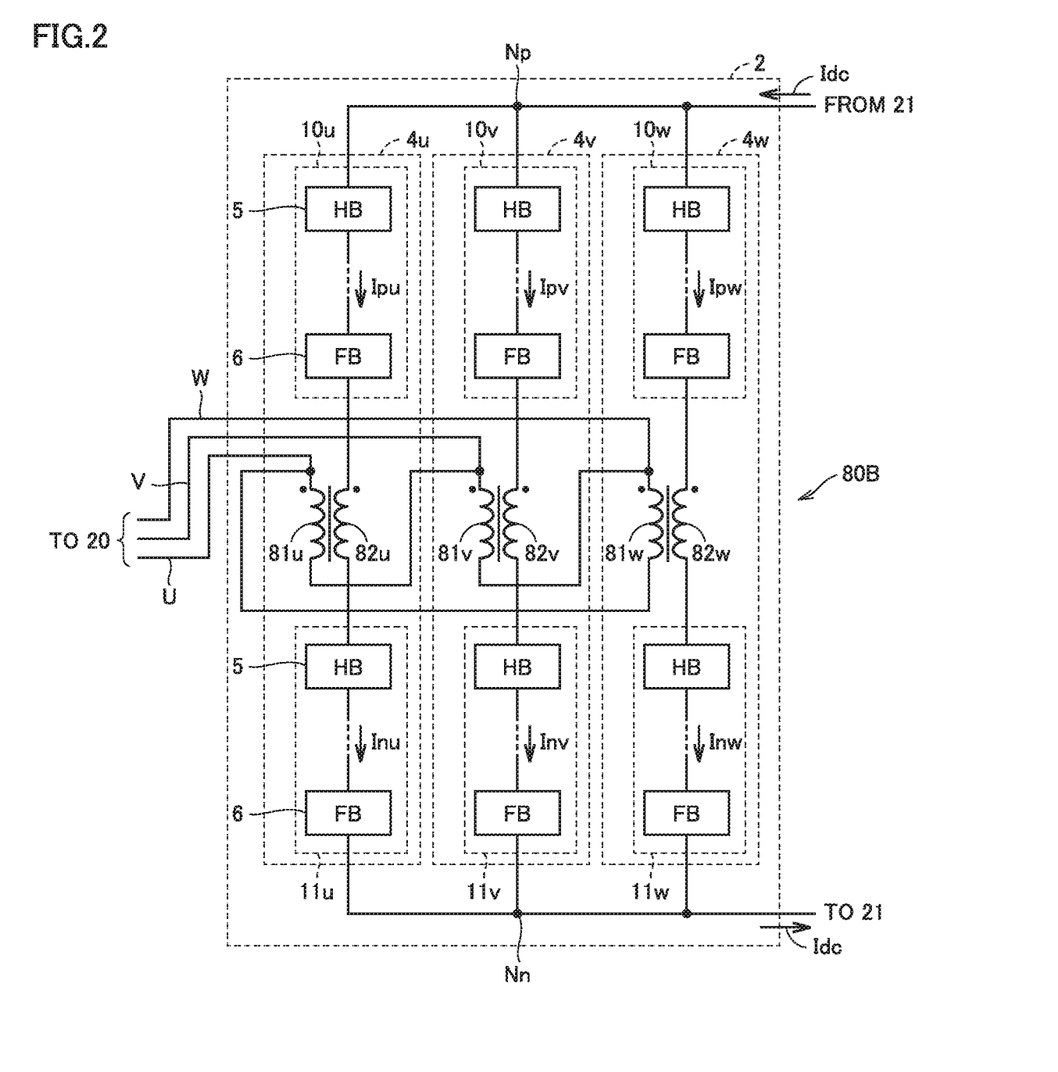
FIG. 2 shows a modification of a connection portion connecting an AC circuit and each leg circuit.
Figure 3:
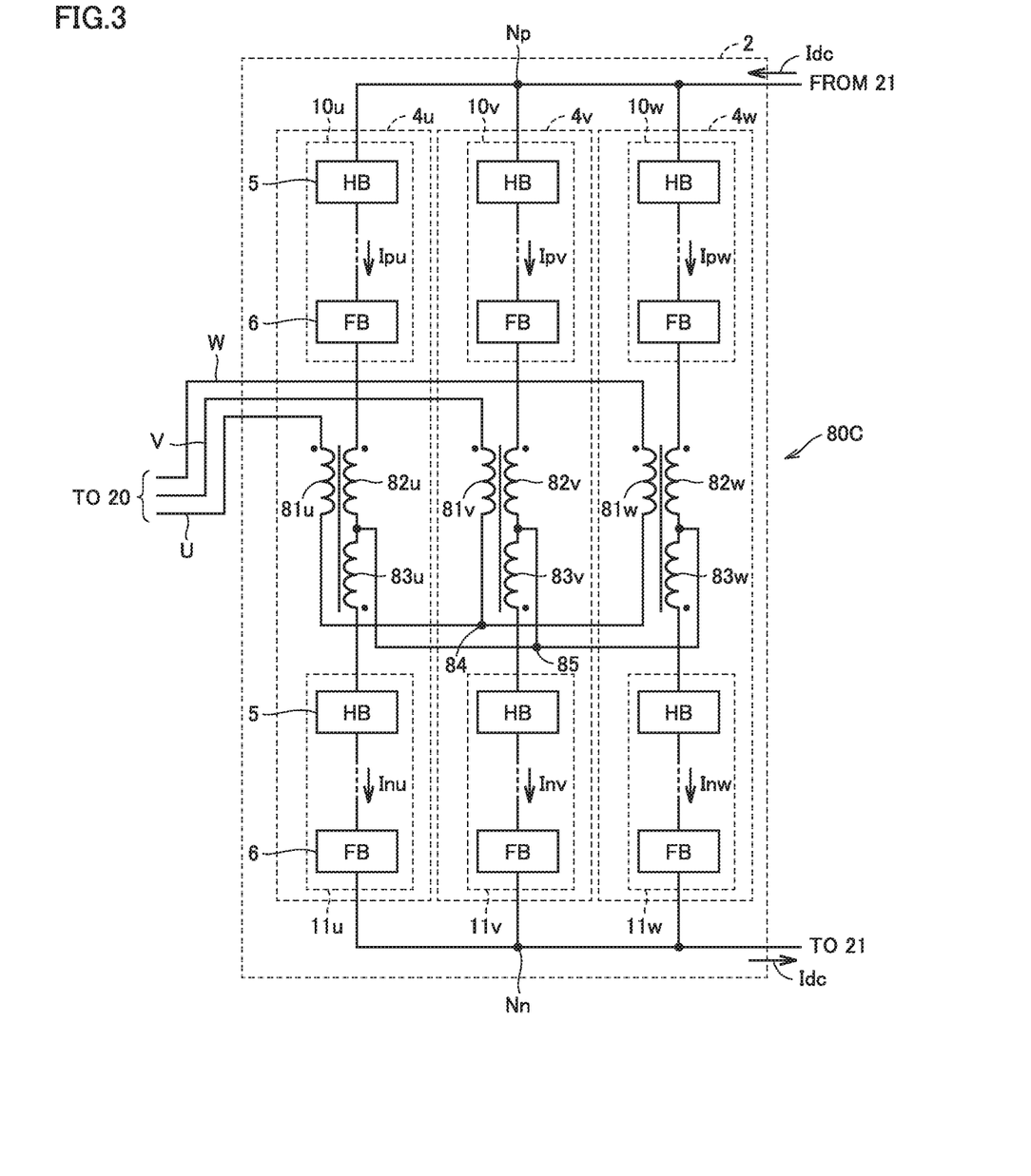
FIG. 3 shows another modification of the connection portion connecting the AC circuit and each leg circuit.

Instead of using interconnection transformer 22 in FIG. 1, AC nodes Nu, Nv and Nw may be connected to AC circuit 20 with an interconnection reactor being interposed. In addition, as shown in FIGS. 2 and 3, AC circuit 20 and each leg circuit 4 may be connected in an AC manner. A detailed configuration of a connection portion connecting AC circuit 20 and each leg circuit 4 in this case will be described below.

Leg circuit 4u is separated into a high potential-side arm circuit (also referred to as "upper arm circuit" or "primary arm circuit") 10 extending from high potential-side DC node Np to AC node Nu, and a low potential-side arm circuit (also referred to as "lower arm circuit" or "secondary arm circuit") 11 extending from low potential-side DC node Nn to AC node Nu. A connection point Nu connecting high potential-side arm circuit 10 and low potential-side arm circuit 11 is connected to transformer 22. High potential-side DC node Np and low potential-side DC node Nn are connected to DC circuit 21. Leg circuits 4v and 4w have a similar configuration, and thus, leg circuit 4u will be described below as a typical example.

High potential-side arm circuit 10 includes a plurality of half bridge (HB)-type converter cells 5, one or more full bridge (FB)-type converter cells 6, and a reactor 7a. The plurality of converter cells 5, at least one converter cell 6 and reactor 7a are connected in series to each other. Hereinafter, for ease of description, the converter cell may be simply referred to as "cell". Half bridge-type converter cells 5 and one or more full bridge-type converter cells 6 may be connected in any order.

Similarly, low potential-side arm circuit 11 includes a plurality of half bridge-type converter cells 5, one or more full bridge-type converter cells 6, and a reactor 7b. The plurality of converter cells 5, at least one converter cell 6 and reactor 7b are connected in series to each other. Half bridge-type converter cells 5 and one or more full bridge-type converter cells 6 may be connected in any order.

Reactors 7a and 7b are provided such that arm currents Ipu and Ipn do not rapidly change at the moment when the cells in each leg circuit are turned on or off and an output voltage rapidly changes or when AC circuit 20, DC circuit 21 or the like fails.

A position where reactor 7a is inserted may be any position in high potential-side arm circuit 10 of leg circuit 4u, and a position where reactor 7b is inserted may be any position in low potential-side arm circuit 11 of leg circuit 4u. A plurality of reactors 7a may be provided and a plurality of reactors 7b may be provided. The reactors may be different from each other in inductance value. Furthermore, only reactor 7a of high potential-side aim circuit 10 or only reactor 7b of low potential-side arm circuit 11 may be provided.

As detectors configured to measure an amount of electricity (i.e., a current and a voltage) used for control, power conversion device 1 in. FIG. 1 further includes an AC voltage detector 23, an AC current detector 24, DC voltage detectors 25p and 25n, and arm current detectors 9a and 9b provided in each leg circuit 4. Signals detected by these detectors are input to central controller 3.

Specifically, AC voltage detector 23 detects a voltage value Vacu of the U phase of AC circuit 20, a voltage value Vacv of the V phase of AC circuit 20, and a voltage value Vacw of the W phase of AC circuit 20. AC current detector 24 detects a current value Iacu of the U phase of AC circuit 20, a current value Iacy of the V phase of AC circuit 20, and a current value Iacw of the W phase of AC circuit 20. DC voltage detector 25p detects a voltage of high potential-side DC node lip connected to DC circuit 21. DC voltage detector 25n detects a voltage of low potential-side DC node Nn connected to DC circuit 21.

In addition, arm current detectors 9a and 9b provided in leg circuit 4u for the U phase detect arm current Ipu flowing through high potential-side arm circuit 10 and arm current Inu flowing through low potential-side arm circuit 11, respectively. Similarly, arm current detectors 9a and 9b provided in leg circuit 4v for the V phase detect a high potential-side arm current Ipv and a low potential-side arm current Inv, respectively. Arm current detectors 9a and 9b provided in leg circuit 4w for the W phase detect a high potential-side arm current Ipw and a low potential-side arm current Inw, respectively. Based on these arm currents, a DC current Idc flowing through DC circuit 21 and a circulating current circulating among the leg circuits can be calculated.

The signals detected by the above-described detectors are input to central controller 3. Central controller 3 further receives, from each cell 5, 6, a signal indicating a detection value of a cell capacitor voltage. Based on the signals detected by the above-described detectors and the information about the cell capacitor voltages, central controller 3 outputs, to each cell 5, 6, a control instruction for controlling an operation state of each cell 5, 6 and an operation/stop instruction (an operation instruction or a stop instruction) for protecting each cell 5, 6.

For ease of illustration, FIG. 1 collectively shows a part of signal lines for the signals input from the detectors to central controller 3 and a part of signal lines for the signals transmitted between central controller 3 and cells 5. Actually, however, the signal line is individually provided for each detector and for each cell 5, 6. A signal line for transmission and a signal line for reception may be separately provided between each cell 5, 6 and central controller 3. In the case of the present embodiment, these signal lines are formed of optical fibers from the viewpoint of noise resistance.

Central controller 3 is formed by a circuit and can be formed by, for example, at least one microcomputer, or at least one ASIC (Application Specific Integrated Circuit), or at least one FPGA (Field Programmable Gate Array). Alternatively, central controller 3 may be formed by combining any of the foregoing. The microcomputer includes at least one processor (e.g., a CPU (Central Processing Unit)). The processor can execute all or a part of functions of central controller 3 by reading one or more commands from at least one computer-readable non-transitory storage medium (such as, for example, a magnetic medium such as a hard disk, an optical medium such as a CD (Compact Disk) and a DVD (Digital Video Disk), and a semiconductor memory).

[Modification of Connection Portion Connecting AC Circuit and Each. Leg Circuit]

FIG. 1 shows an example in which AC circuit 20 and a power conversion circuit portion 2 are connected in a DC manner through AC nodes Nu, Nv and Nw provided in leg circuits 4u, 4v and 4w, respectively. Instead of this, AC circuit 20 and each leg circuit 4 may be connected in an AC manner with a transformer being interposed. Some specific examples will be described below with reference to FIGS. 2 and 3.

FIG. 2 shows a modification of a connection portion connecting the AC circuit and each leg circuit. Referring to FIG. 2, AC circuit 20 and each of leg circuits 4u, 4v and 4w are connected with a three-phase transformer 80B being interposed.

As shown in FIG. 2, in three-phase transformer 80B, primary windings 81u, 81v and 81w are Δ-connected. Specifically, primary winding 81u of three-phase transformer 80B is connected between the U phase and the V phase of AC circuit 20. Primary winding 81v of three-phase transformer 80B is connected between the V phase and the W phase of AC circuit 20. Primary winding 81w of three-phase transformer 80B is connected between the W phase and the U phase of AC circuit 20.

Secondary windings 82u, 82v and 82w of three-phase transformer 80B are magnetically coupled to primary windings 81u, 81v and 81w, respectively, with a common iron core being interposed. Furthermore, secondary winding 82u is connected in series to arm circuits 10u and 11u of the U phase, secondary winding 82v is connected in series to arm circuits 10v and 11v of the V phase, and secondary winding 82w is connected in series to arm circuits 10w and 11w of the W phase.

In the case of FIG. 2, each of secondary windings 82u, 82v and 82w functions as reactors 7a and 7b of each phase. Unlike the case of FIG. 2, secondary windings 82u, 82v and 82w of three-phase transformer 80B may be provided separately from reactors 7a and 7b.

A DC magnetic flux generated in the iron core can be canceled out by flowing a DC component through Δ-connected primary windings 81u, 81v and 81w.

FIG. 3 shows another modification of the connection portion connecting the AC circuit and each leg circuit. Referring to FIG. 3, AC circuit 20 and each of leg circuits 4u, 4v and 4w are connected with a three-phase transformer 80C of three windings being interposed.

Specifically, one ends of primary windings 81u, 81v and 81w of three-phase transformer 80C in FIG. 3 are connected to power transmission lines of the U phase, the V phase and the W phase of AC circuit 20, respectively, with interconnection transformer 22 being interposed. The other ends of primary windings 81u, 81v and 81w of three-phase transformer 80C are connected to a common neutral point 84. That is, in the case of FIG. 3, primary windings 81u, 81v and 81w are Y-connected.

Secondary windings 82u, 82v and 82w of three-phase transformer 80C are magnetically coupled to primary windings 81u, 81v and 81w, respectively, with a common iron core being interposed. In three-phase transformer 80C in FIG. 3, tertiary windings 83u, 83v and 83w connected in series to secondary windings 82u, 82v and 82w, respectively, are further provided. The secondary winding of each phase and the corresponding tertiary winding are connected so as to be opposite in polarity, and are wound around the common iron core. In addition, a connection point connecting the secondary winding of each phase and the corresponding tertiary winding is connected to a common neutral point 810.

Furthermore, secondary winding 82u and tertiary winding 83u are connected in series to arm circuits 10u and 11u of the U phase. Secondary winding 82v and tertiary winding 83v are connected in series to arm circuits 10v and 11v of the V phase. Secondary winding 82w and tertiary winding 83w are connected in series to arm circuits 10w and 11w of the W phase. In the case of FIG. 3, each of secondary windings 82u, 82v and 82w and each of tertiary windings 83u, 83v and 83w also function as reactors 7a and 7b of each phase. Secondary windings 82u, 82v and 82w and tertiary windings 83u, 83v and 83w of three-phase transformer 80C may be provided separately from reactors 7a and 7b.

Three-phase transformer 80C in FIG. 3 has an advantage that the DC electromotive force generated in the secondary windings and the electromotive force generated in the tertiary windings are canceled out because of the arm currents (U phase: Ipu, Inu; V phase: Ipv, Inv; W phase: Ipw, Inw) of the respective phases, and thus, a DC magnetic flux is not generated in the iron core.

[Specific Configuration Example of Converter Cell]

In the present embodiment, half bridge-type converter cell 5 is formed as a single packaged submodule 40. Full bridge-type converter cell 6 is formed by combining two submodules 40. This brings about an advantage that arm circuits 10 and 11 in which the half bridge-type converter cells and the full bridge-type converter cells are arranged in a mixed manner can be formed only by submodules 40 having the same shape and size. Description will be given below with reference to the drawings.

Figure 4:
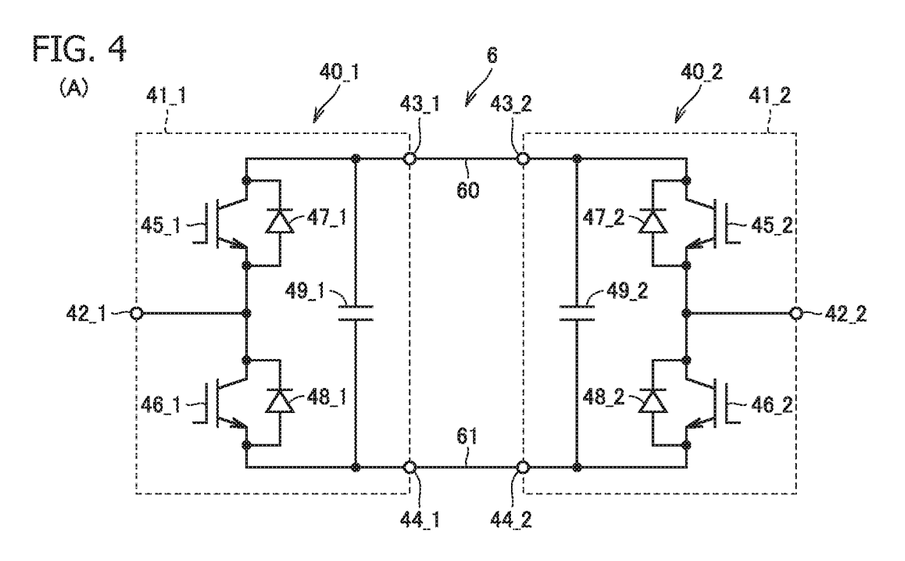
FIG. 4 shows an example circuit configuration of a submodule.

FIG. 4 shows an example circuit configuration of the submodule. FIG. 4(A) shows an example in which one full bridge-type converter cell is formed by combining two submodules 40_1 and 40_2. When a plurality of submodules 40 and components thereof are distinguished from each other as shown in FIG. 4(A), underbars and identification numbers are assigned after the reference characters.

Referring to FIG. 4(A), each submodule 40 includes a package 41, an AC terminal 42, a positive-side terminal 43, a negative-side terminal 44, semiconductor switching elements 45 and 46, diodes 47 and 48, and a DC capacitor 49 serving as an energy accumulator.

Various components (such as semiconductor switching elements 45 and 46, diodes 47 and 48, and DC capacitor 49) forming submodule 40 are built into package 41. Package 41 includes, for example, a case made of resin. AC terminal 42, positive-side terminal 43 and negative-side terminal 44 are provided on or provided to protrude from a surface of package 41.

Semiconductor switching element 45 is connected between positive-side terminal 43 and AC terminal 42. Semiconductor switching element 46 is connected between AC terminal 42 and negative-side terminal 44. A self-exciting semiconductor switching element such as an IGBT (Insulated Gate Bipolar Transistor) or a GCT (Gate Commutated Turn-off thyristor) is, for example, used as semiconductor switching elements 45 and 46.

Diodes 47 and 48 are connected in antiparallel (i.e., in parallel and in a reverse bias direction) to semiconductor switching elements 45 and 46, respectively. Diodes 47 and 48 are provided to ensure a current path when a reverse voltage is applied to corresponding semiconductor switching elements 45 and 46.

DC capacitor 49 is connected between positive-side terminal 43 and negative-side terminal 44. Therefore, DC capacitor 49 is connected in parallel to semiconductor switching elements 45 and 46 connected in series to each other.

As shown in the figure, when full bridge-type converter cell 6 is formed by two submodules 40_1 and 40_2, a positive-side terminal 43_1 of one submodule 40_1 and a positive-side terminal 43_2 of the other submodule 40_2 are connected through a wiring 60. Furthermore, a negative-side terminal 44_1 of one submodule 40_1 and a negative-side terminal 44_2 of the other submodule 40_2 are connected through a wiring 61. An AC terminal 42_1 of submodule 40_1 and an AC terminal 42_2 of submodule 40_2 are used for connection to other elements or the like that are adjacent on the low potential side.

Although a conductor bar referred to as "bus bar" or a conductor plate can, for example, be used as wirings 60 and 61 described above, the present disclosure is not limited thereto. A bare wire, a metal pipe or the like may, for example, be used.

FIG. 4(B) is an equivalent circuit diagram corresponding to FIG. 4(A). In the equivalent circuit diagram of FIG. 4(B), positive-side terminals 43_1 and 43_2 coupled to each other as shown in FIG. 4(A) are replaced with one positive-side node 43A. Negative-side terminals 44_1 and 44_2 coupled to each other as shown in FIG. 4(A) are replaced with one negative-side node 44A. DC capacitors 49_1 and 49_2 connected in parallel as shown in FIG. 4(A) are replaced with one DC capacitor 50. As is clear from FIG. 4(B), it can be seen that full bridge-type converter cell 6 can be formed by the connection between the terminals shown in FIG. 4(A).

Figure 5:
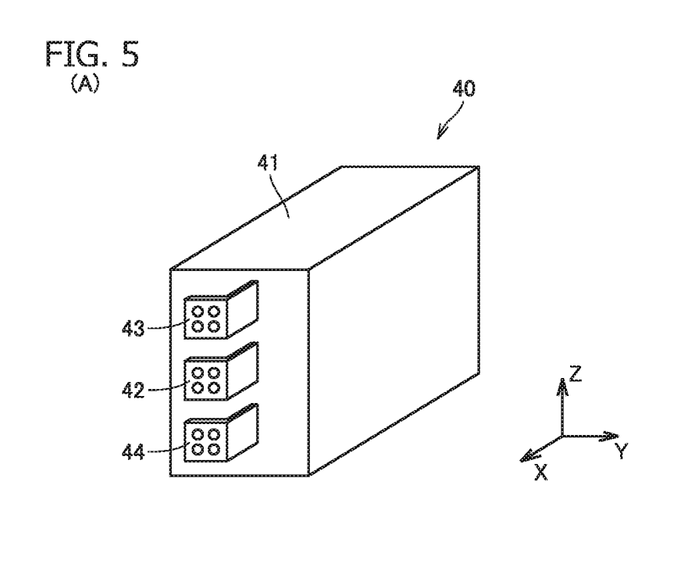
FIG. 5 is a perspective view schematically showing a physical appearance of the submodule.

FIG. 5 is a perspective view schematically showing a physical appearance of the submodule. In the following description, a front/back direction is referred to as "X direction", a right/left direction (or a horizontal direction) is referred to as "Y direction", and an up/down direction (or a vertical direction) is referred to as "Z direction".

FIG. 5(A) shows an example appearance of single submodule 40. In the example in FIG. 5(A), submodule 40 has package 41 having a substantially rectangular parallelepiped shape with the X direction being a longitudinal direction. AC terminal 42, positive-side terminal 43 and negative-side terminal 44 are provided on a front surface (surface on the +X direction side) of package 41. In the case of FIG. 5(A), positive-side terminal 43, AC terminal 42 and negative-side terminal 44 are aligned in this order from above. However, this order of alignment is merely one example and the present disclosure is not limited thereto.

FIG. 5(B) shows an appearance diagram when one full bridge-type converter cell is formed by combining two submodules 40_1 and 40_2.

Referring to FIG. 5(B), submodules 40_1 and 40_2 are arranged side by side in the right/left direction. As a result, the terminals provided in each submodule 40 are arranged to face the common front surface side. As shown in the figure, positive-side terminal 43_1 of one submodule 40_1 and positive-side terminal 43_2 of the other submodule 40_2 are connected through wiring 60. Furthermore, negative-side terminal 44_1 of one submodule 40_1 and negative-side terminal 44_2 of the other submodule 40_2 are connected through wiring 61. In the case of FIG. 5(B), a conductor bar referred to as "bus bar" is used as wirings 60 and 61.

The above-described configuration in FIG. 5 is merely one example, and the shape of package 41 of submodule 40 and arrangement of AC terminal 42, positive-side terminal 43 and negative-side terminal 44 on the surface of package 41 are not limited to the example in FIG. 5. For example, as described below, positive-side terminal 43 is used only for connection between two submodules 40 forming the full bridge-type converter cell. Therefore, in FIG. 5(A), AC terminal 42 and negative-side terminal 44 may be arranged on the front surface (surface on the +X side) of package 41 and positive-side terminal 43 may be arranged on a back surface (surface on the −X side) of package 41.

[Specific Configuration Example of Arm Circuit]

Next, a configuration example of the arm circuit formed by coupling a plurality of submodules will be described.

Figure 6:
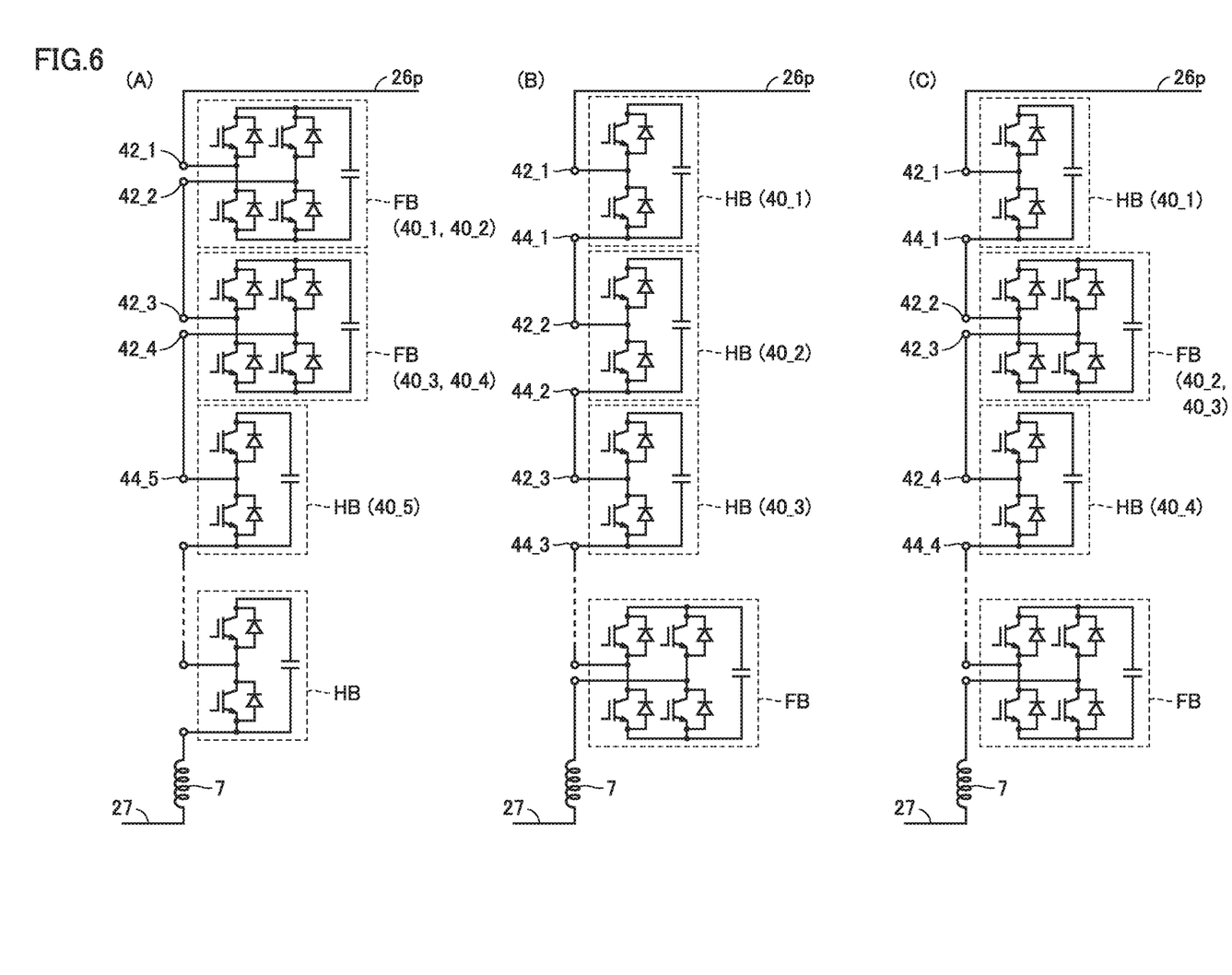
FIG. 6 is a circuit diagram showing an example configuration of a high potential-side arm circuit.

FIG. 6 is a circuit diagram showing an example configuration of the high potential-side arm circuit. A circuit diagram in FIG. 6(A) shows an example in which full bridge-type converter cells are arranged in the proximity of a high potential-side DC line 26p connected to DC circuit 21. A circuit diagram in FIG. 6(B) shows an example in which a full bridge-type converter cell is arranged in the proximity of an AC line 27 connected to AC circuit 20. A circuit diagram in FIG. 6(C) shows an example in Which half bridge-type converter cells and full bridge-type converter cells are arranged in a mixed manner. In each of the examples, a plurality of submodules 40 are arranged in the order of submodules 40_1, 40_2, 40_3 . . . from the high potential side.

Referring to FIG. 6(A), a full bridge-type converter cell is formed by submodules 40_1 and 40_2. Furthermore, a full bridge-type converter cell is formed by submodules 40_3 and 40_4. Submodule 40_5 is used as a half bridge-type converter cell.

In this case, AC terminal 42_1 of submodule 40_1 is connected to DC line 26p. AC terminal 42_2 of submodule 40_2 and an AC terminal 42_3 of submodule 40_3 are connected through a wiring. An AC terminal 42_4 of submodule 40_4 and AC terminal 42_5 of submodule 40_5 are connected through a wiring.

Referring to FIG. 6(B), submodules 40_1 to 40_3 are used as half bridge-type converter cells.

In this case, AC terminal 42_1 of submodule 40_1 is connected to DC line 26p. Negative-side terminal 44_1 of submodule 40_1 and AC terminal 42_2 of submodule 40_2 are connected through a wiring. Negative-side terminal 44_2 of submodule 40_2 and an AC terminal 42_3 of submodule 40_3 are connected through a wiring.

As described above, when submodules 40 are used as half bridge-type converter cells, AC terminals 42 and negative-side terminals 44 are used for connection to the adjacent elements. Positive-side terminals 43 are not used for connection.

Referring to FIG. 6(C), submodule 40_1 is used as a half bridge-type converter cell. A full bridge-type converter cell is formed by submodules 40_2 and 40_3. Submodule 40_4 is used as a half bridge-type converter cell.

In this case, AC terminal 42_1 of submodule 40_1 is connected to DC line 26p. Negative-side terminal 44_1 of submodule 40_1 and AC terminal 42_2 of submodule 40_2 are connected through a wiring. AC terminal 42_3 of submodule 40_3 and AC terminal 42_4 of submodule 40_4 are connected through a wiring.

In summary, when the full bridge-type converter cell is formed by two submodules 40 that are adjacent to each other, each of AC terminal 42 of one submodule 40 and AC terminal 42 of the other submodule 40 is used for connection to the adjacent external element. In addition, as described with reference to FIGS. 4 and 5, in two submodules 40 forming the full bridge-type converter cell, positive-side terminals 43 are connected to each other and negative-side terminals 44 are connected to each other.

In contrast, when the half bridge-type converter cell is formed by single submodule 40, AC terminal 42 and negative-side terminal 44 are used for connection to the adjacent external element. Positive-side terminal 43 is not used.

Figure 7:
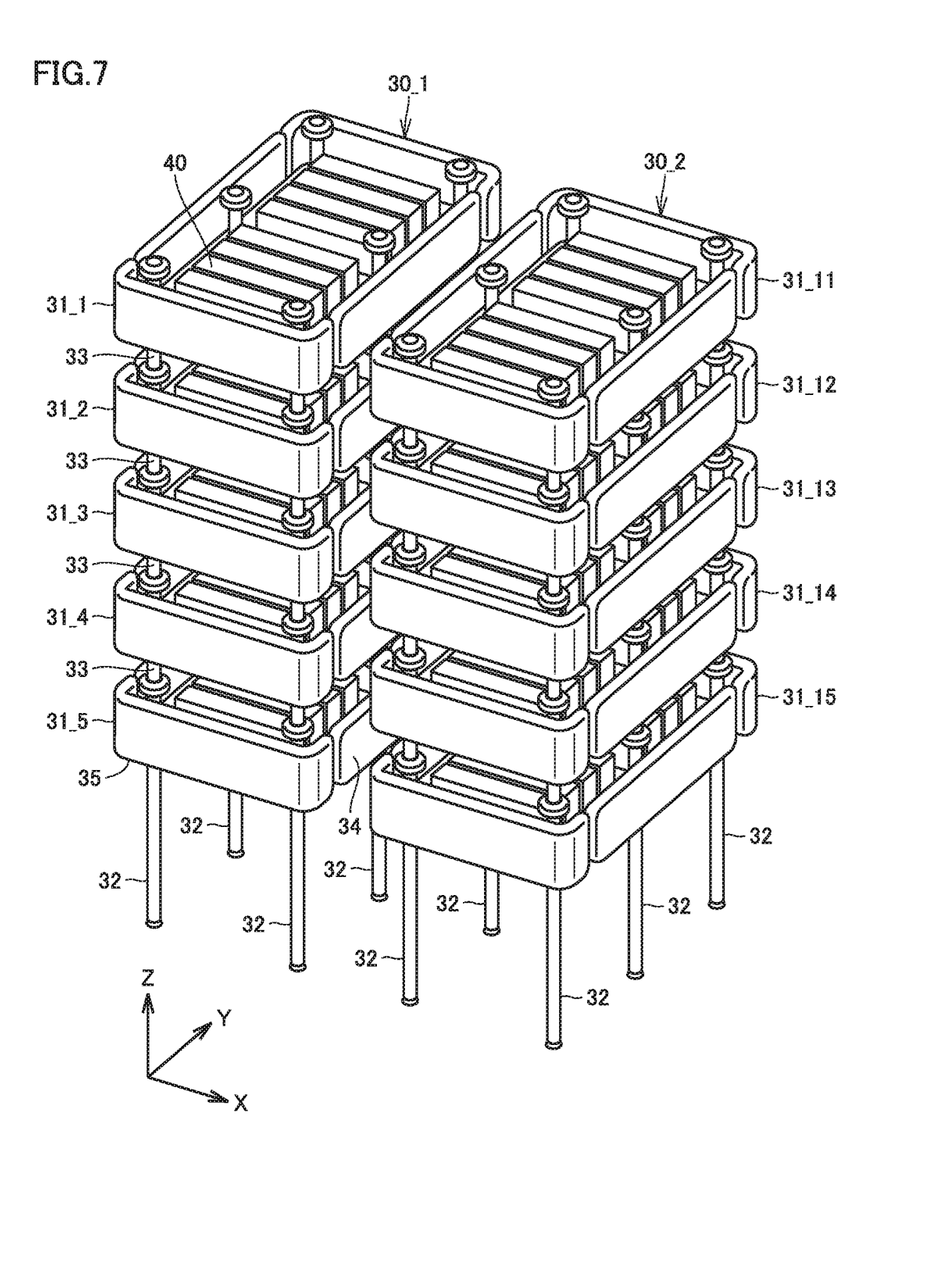
FIG. 7 is a perspective view schematically showing a physical appearance of the arm circuit.

FIG. 7 is a perspective view schematically showing a physical appearance of the arm circuit. In the example in FIG. 7, a plurality of submodules 40 are aligned in the horizontal direction (Y direction) to form a block, and each block is arranged in a tray-like insulating container 31. A plurality of containers 31 are stacked vertically to form a tower 30.

In the example in FIG. 7, each insulating container 31 is formed by a bottom plate 35 having a substantially rectangular shape, and a side plate 34 standing from an edge portion of bottom plate 35. Lowermost insulating container 31 is supported by a plurality of support rods 32 standing on a floor surface. Each of insulating containers 31 provided above lowermost insulating container 31 is supported by a plurality of support rods 33 standing from lowermost insulating container 31.

Specifically, in the example in FIG. 7, an arm circuit is formed by two towers 30_1 and 30_2. Tower 30_1 includes five insulating containers 31_1 to 31_5, and tower 30_2 includes five insulating containers 31_11 to 31_15. In each insulating container 31, eight submodules 40 are arranged side by side in the horizontal direction (Y direction). Of course, the number described above is merely one example and the present disclosure is not limited thereto.

As shown in the figure, respective submodules 40 have the same shape, and thus, submodules 40 can be arranged with high space efficiency. Next, connection between submodules 40 will be described in detail with reference to a specific example.

[Specific Example of Connection Between Submodules Forming Arm Circuit]

Figure 8:
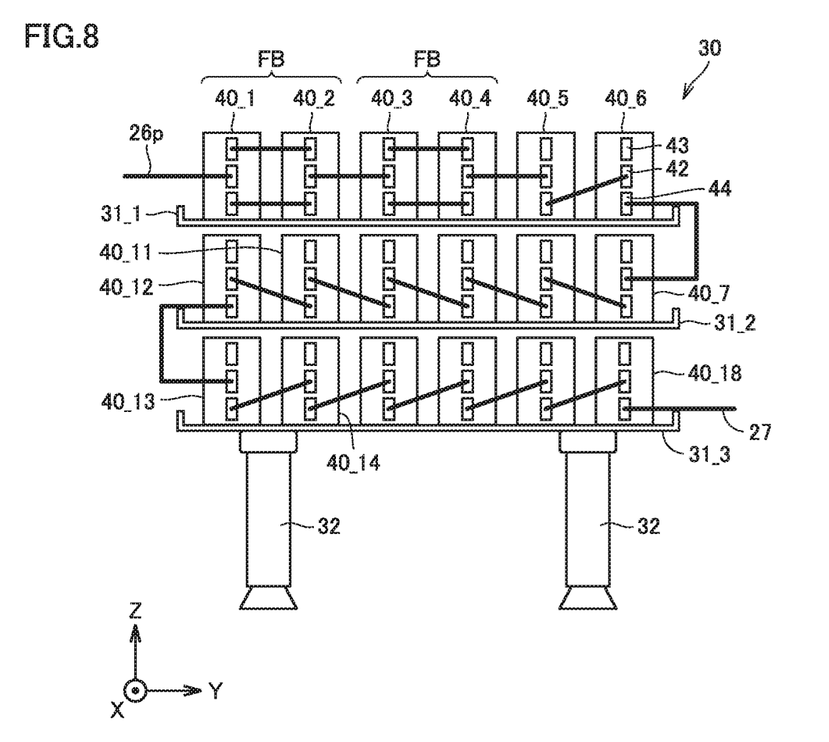
FIG. 8 is a diagram for lustrating connection between the submodules forming the arm circuit.

FIG. 8 is a diagram for illustrating connection between the submodules forming the arm circuit.

FIG. 8 shows an example in which high potential-side arm circuit 10 is formed by tower 30 including three-tier insulating containers 31_1 to 31_3. Six submodules 40 are arranged in each insulating container 31. Specifically, six submodules 40_1 to 40_6 are arranged in insulating container 31_1, six submodules 40_7 to 40_12 are arranged in insulating container 31_2, and six submodules 40_13 to 40_18 are arranged in insulating container 31_3. Submodule 40_1 is on the highest potential side and submodule 40_18 is on the lowest potential side.

Submodules 40 are arranged horizontally, and thus, the terminals (i.e., positive-side terminal 43, AC terminal 42 and negative-side terminal 44) are provided on the front surface of each submodule 40. This facilitates connection between adjacent submodules 40.

Figure 9:
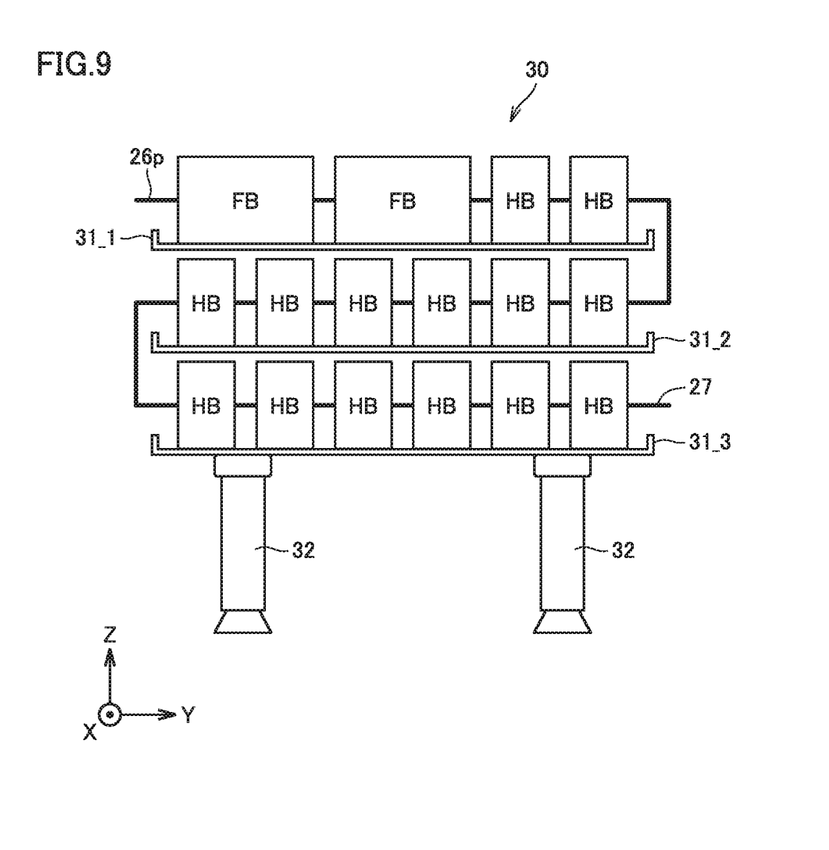
FIG. 9 is a diagram in which arrangement of the submodules shown in FIG. 8 is replaced with arrangement of half bridge-type converter cells and full bridge-type converter cells.

FIG. 9 is a diagram in Which the arrangement of the submodules shown in FIG. 8 is replaced with arrangement of half bridge-type converter cells and full bridge-type converter cells. In the example shown in FIGS. 8 and 9, a full bridge-type converter cell is formed by submodules 40_1 and 40_2, and a full bridge-type converter cell is formed by submodules 40_3 and 40_4. The other submodules 40 are each used as a half bridge-type converter cell.

Next, connection between the submodules will be specifically described with reference to FIG. 8. First, in submodule 40_1 and submodule 40_2 forming a full bridge-type converter cell, positive-side terminals 43 are connected to each other and negative-side terminals 44 are connected to each other. AC terminal 42 of submodule 40_1 is connected to high potential-side DC line 26p of the DC circuit. AC terminal 42 of submodule 40_2 is connected to AC terminal 42 of submodule 40_3 that is adjacent on the low potential side.

Similarly, in submodule 40_3 and submodule 40_4 forming a full bridge-type converter cell, positive-side terminals 43 are connected to each other and negative-side terminals 44 are connected to each other. AC terminal 42 of submodule 40_3 is connected to AC terminal 42 of submodule 40_2 that is adjacent on the high potential side. AC terminal 42 of submodule 40_4 is connected to AC terminal 42 of submodule 40_5 that is adjacent on the low potential side.

Each of submodules 40_5 to 40_18 forms a half bridge-type converter cell. In this case, when submodule 40 that is adjacent on the high potential side forms a half bridge-type converter cell, AC terminal 42 of each submodule 40 is connected to negative-side terminal 44 of that submodule 40. When submodule 40 that is adjacent on the high potential side forms a full bridge-type converter cell, AC terminal 42 of submodule 40 is connected to AC terminal 42 of that submodule 40.

Figure 10:
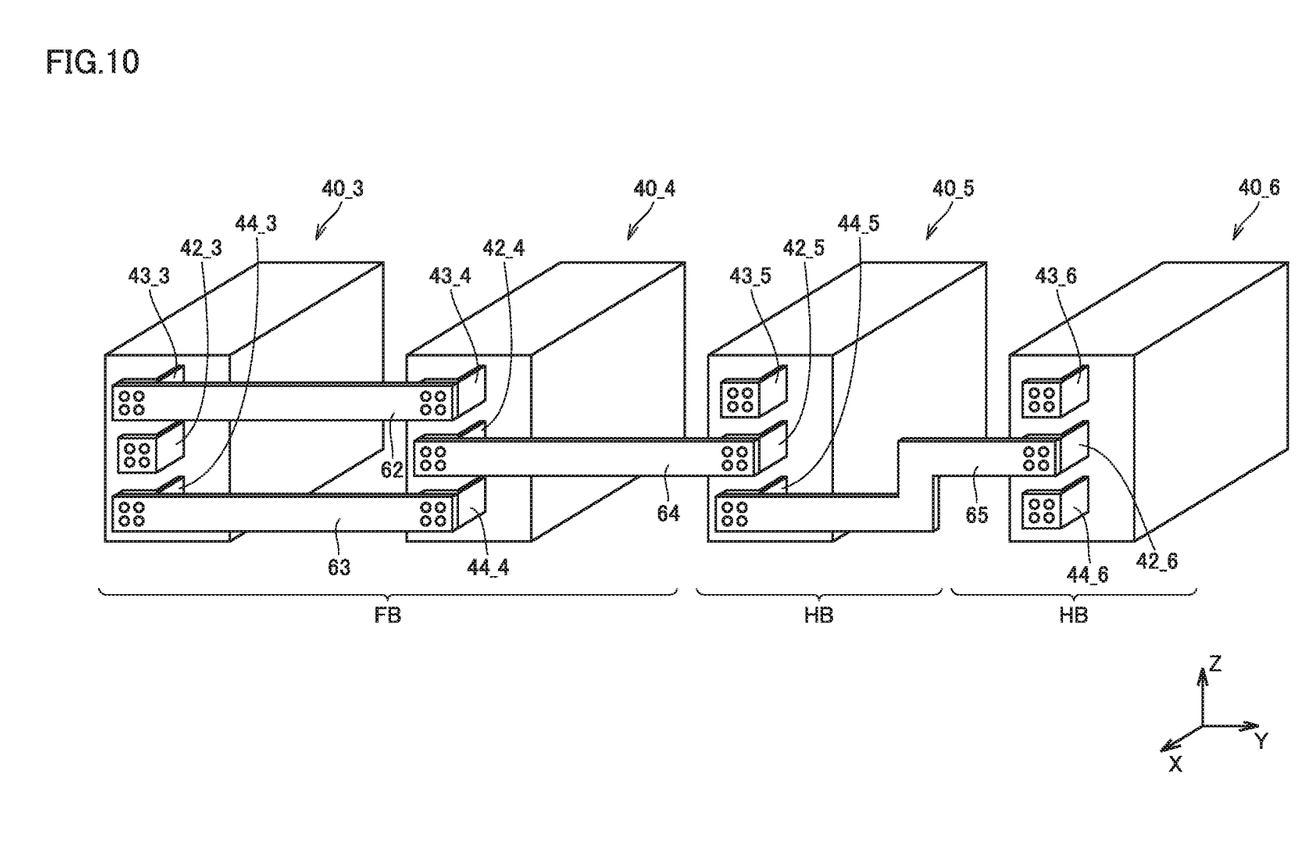
FIG. 10 is an appearance diagram schematically showing mutual connection among submodules 40_3 to 40_6 in FIG. 8.

In contrast, negative-side terminal 44 of each submodule 40 forming a half bridge-type converter cell is connected to AC terminal 42 of submodule 40 that is adjacent on the low potential side. Whether submodule 40 that is adjacent on the low potential side forms a half bridge-type converter cell or a full bridge-type converter cell, there is no difference. Negative-side terminal 44 of submodule 40_18 on the lowest potential side is connected to AC line 27 of AC circuit 20. FIG. 10 is an appearance diagram schematically showing mutual connection among submodules 40_3 to 40_6 in FIG. 8.

Referring to FIGS. 8 and 10, as to adjacent submodules 40_3 and 40_4 forming a full bridge-type converter cell, positive-side terminals 43_3 and 43_4 are connected to each other through a bus bar 62, and negative-side terminals 44_3 and 44_4 are connected to each other through a bus bar 63.

Each of submodules 40_5 and 40_6 on the low potential side relative to submodule 40_4 is used as a half bridge-type converter cell. In this case, AC terminal 42_5 of submodule 40_5 is connected, through a bus bar 64, to AC terminal 42_4 of submodule 40_4 that is adjacent on the high potential side and forms a full bridge-type converter cell. Negative-side terminal 44_5 of submodule 40_5 is connected, through a bus bar 65, to AC terminal 42_6 of submodule 40_6 that is adjacent on the low potential side and forms a half bridge-type converter cell.

Figure 11:
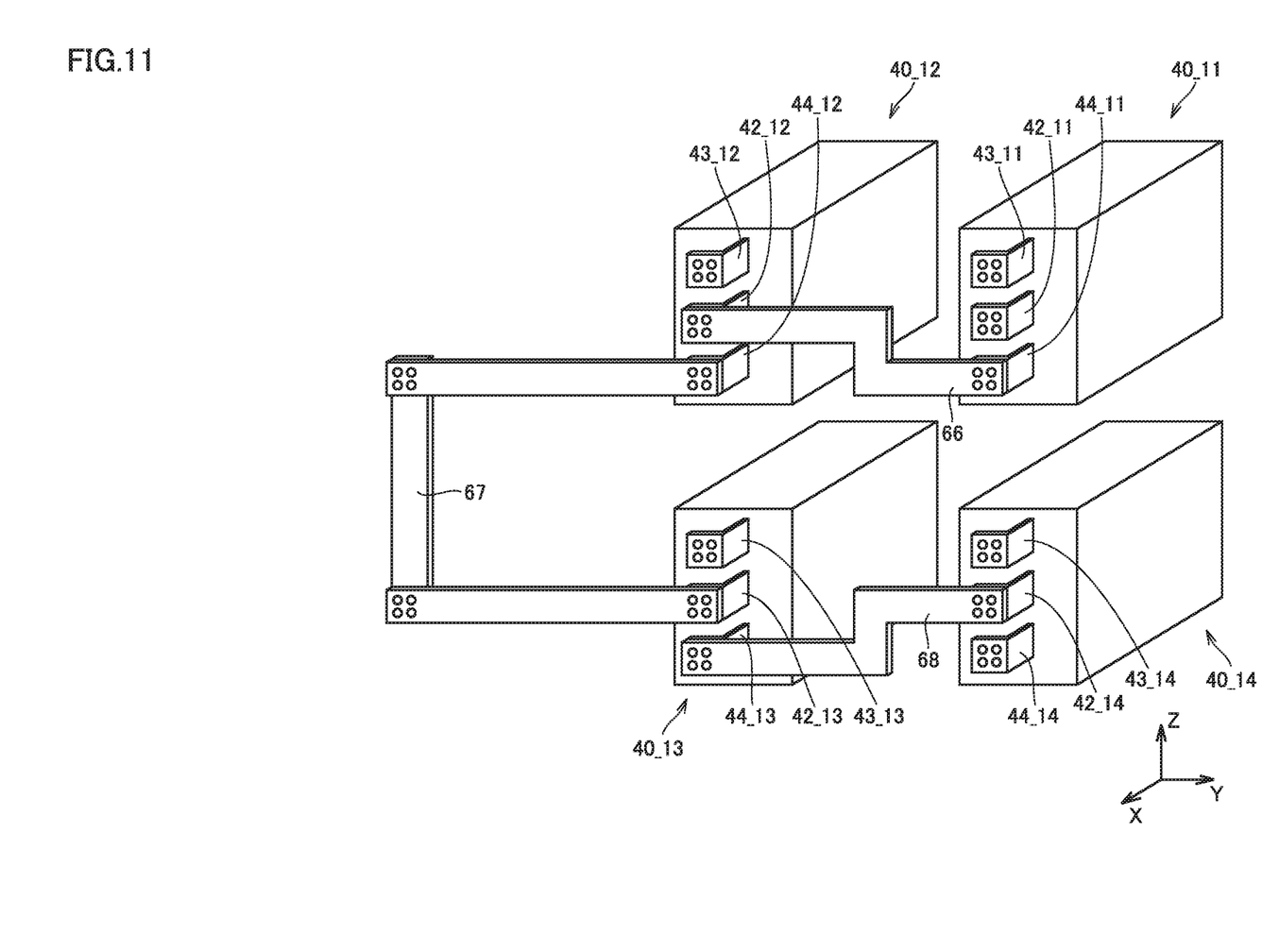
FIG. 11 is an appearance diagram schematically showing mutual connection among submodules 40_11 to 40_14 in FIG. 8.

FIG. 11 is an appearance diagram schematically showing mutual connection among submodules 40_11 to 40_14 in FIG. 8.

Referring to FIGS. 8 and 11, each of submodules 40_11 to 40_14 is used as a half bridge-type converter cell. In this case, negative-side terminal 44_11 of submodule 40_11 is connected, through a bus bar 66, to AC terminal 42_12 of submodule 40_12 that is adjacent on the low potential side. Negative-side terminal 44_12 of submodule 40_12 is connected, through a bus bar 67, to AC terminal 42_13 of submodule 40_13 that is adjacent on the low potential side. Negative-side terminal 44_13 of submodule 40_13 is connected, through a bus bar 68, to AC terminal 42_14 of submodule 40_14 that is adjacent on the low potential side.

Submodule 40_13 is arranged in insulating container 31_3 provided below insulating container 31_2 in which submodule 40_12 is arranged. Therefore, submodules 40_12 and 40_13 are connected via a relatively long path such that bus bar 67 connecting submodules 40_12 and 40_13 bypasses the side plate of insulating container 312.

[Effect]

As described above, according to the power version device of the present embodiment, the half bridge-type converter cell is formed as single packaged submodule 40, and the full bridge-type converter cell is formed by combining two submodules 40 described above. As a result, the arm circuit in which the half bridge-type converter cells and the full bridge-type converter cells are arranged in a mixed manner can be formed only by submodules 40 having the same shape and size. Therefore, there can be provided an MMC-type power conversion device in which half bridge-type converter cells and full bridge-type converter cells can be arranged with high space efficiency.

It should be understood that the embodiments disclosed herein are illustrative and non-restrictive in every respect. The scope of the present disclosure is defined by the terms of the claims and is intended to include any modifications within the scope and meaning equivalent to the terms of the claims.

REFERENCE SIGNS LIST

1 power conversion device; 2 power conversion circuit portion; 3 central controller; 4*u*, 4*v*, 4*w* leg circuit; 5 half bridge-type converter cell; 6 full bridge-type converter cell; 7*a*, 7*b* reactor; 9*a*, 9*b* arm current detector; 10 high potential-side arm circuit; 11 low potential-side arm circuit; 20 AC circuit; 21 DC circuit; 22 interconnection transformer; 23 AC voltage detector; 24 AC current detector; 25*n*, 25*p* DC voltage detector; 30 tower; 31 insulating container; 40 submodule; 41 package; 42 AC terminal; 43 positive-side terminal; 44 negative-side terminal; 45, 46 semiconductor switching element; 47, 48 diode; 49, 50 DC capacitor; Nn low potential-side DC node; Np high potential-side DC node; Nu, Nv, Nw AC node.

The invention claimed is:

1. A power conversion device of modular multilevel conversion type, comprising:
 a plurality of converter cells cascade-connected to each other; and
 a plurality of electrically insulating containers stacked vertically to form a tower,
 the plurality of converter cells including:
 one or more full bridge-type converter cells; and
 a plurality of half bridge-type converter cells,
 the plurality of converter cells being constituted by cascade-connecting a plurality of submodules as constituent units,
 each of the plurality of half bridge-type converter cells including only one submodule of the plurality of submodules,
 each of the one or more full bridge-type converter cells including only two submodules of the plurality of submodules,
 each of the plurality of submodules including:
 a package;
 a first terminal, a second terminal and a third terminal, the first to third terminals being provided on or provided to protrude from a surface of the package;
 a first semiconductor switching element built into the package and connected between the first terminal and the second terminal;
 a second semiconductor switching element built into the package and connected between the second terminal and the third terminal; and
 a DC capacitor built into the package and connected between the first terminal and the third terminal,
 the plurality of submodules being identical to each other in outer shape and size,
 the plurality of electrically insulating containers being identical to each other in outer shape and size,
 the plurality of electrically insulating containers including:
 one or more first electrically insulating containers each of which houses a first submodule and a second submodule functioning as a full bridge-type converter cell, and at least one submodule functioning as a half bridge-type converter cell; and
 a plurality of second electrically insulating containers each of which houses only the submodules each functioning as a half bridge-type converter cell,
 each of the one or more first electrically insulating containers and each of the plurality of second electrically insulating containers housing the same number of submodules,
 the first terminal of the first submodule and the first terminal of the second submodule being connected to each other through a wiring,
 the third terminal of the first submodule and the third terminal of the second submodule being connected to each other through a wiring,
 the second terminal of the first submodule being used for connection to a third submodule arranged adjacent to the first submodule, the second terminal of the second submodule being used for connection to a fourth submodule arranged adjacent to the second submodule, wherein each electrically insulating container of the plurality of insulating containers comprises at least three submodules of the plurality of submodules where a particular submodule of the at least three submodules is electrically connected in a vertical direction with a submodule of another electrically insulating container and is electrically connected in a horizontal direction with another submodule of the at least three submodules, and wherein a different submodule of the at least three submodules is electrically connected in the horizontal direction with another submodule of the at least three submodules and is not electrically connected with another submodule of another electrically insulating container in the vertical direction.

2. The power conversion device according to claim 1, wherein each of the plurality of second electrically insulating containers houses a fifth submodule and a sixth submodule arranged adjacent to each other, and the third terminal of the fifth submodule and the second terminal of the sixth submodule are connected to each other through a wiring.

3. The power conversion device according to claim 1, wherein the fourth submodule functions as a half bridge-type converter cell, and the second terminal of the second submodule and the second terminal of the fourth third submodule are connected to each other through a wiring.

4. The power conversion device according to claim 3, wherein the third submodule functions as a half bridge-type converter cell, and the third terminal of the third submodule and the second terminal of the first submodule are connected to each other through a wiring.

5. The power conversion device according to claim 4, wherein each of the plurality of second insulating containers houses a fifth submodule and a sixth submodule arranged adjacent to each other, and the third terminal of the fifth submodule and the second terminal of the sixth submodule are connected to each other through a wiring.

6. The power conversion device according to claim 3, wherein each of the plurality of second insulating containers houses a fifth submodule and a sixth submodule arranged adjacent to each other, and the third terminal of the fifth submodule and the second terminal of the sixth submodule are connected to each other through a wiring.

* * * * *